(12) United States Patent
Manevich et al.

(10) Patent No.: US 12,041,160 B2
(45) Date of Patent: Jul. 16, 2024

(54) REDACTABLE BLOCKCHAIN

(71) Applicant: International Business Machines Corporation, Armonk, NY (US)

(72) Inventors: Yacov Manevich, Beer Sheva (IL); Artem Barger, Haifa (IL); Hagar Meir, Tel Aviv (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 355 days.

(21) Appl. No.: 17/007,677

(22) Filed: Aug. 31, 2020

(65) Prior Publication Data

US 2022/0069977 A1    Mar. 3, 2022

(51) Int. Cl.
*H04L 9/06*     (2006.01)
*H04L 9/32*     (2006.01)

(52) U.S. Cl.
CPC .............. *H04L 9/0643* (2013.01); *H04L 9/32* (2013.01)

(58) Field of Classification Search
None
See application file for complete search history.

(56) References Cited

U.S. PATENT DOCUMENTS

| | | |
|---|---|---|
| 10,171,509 B2 | 1/2019 | Anderson |
| 2020/0082266 A1 | 3/2020 | Katz |
| 2020/0127812 A1* | 4/2020 | Schuler ..................... H04L 9/50 |
| 2020/0159891 A1 | 5/2020 | Patel |
| 2020/0204376 A1 | 6/2020 | Nandakumar |
| 2020/0320204 A1* | 10/2020 | Venable, Sr. ........... G06F 21/64 |

FOREIGN PATENT DOCUMENTS

CN       110572254 B     12/2019

OTHER PUBLICATIONS

River Financial "Preimage" [online] River Financial via Archive. org, Jan. 25, 2021 [retrieved Feb. 28, 2023]. URL: https://web.archive.org/web/20210125141959/https://river.com/learn/terms/p/preimage/ (Year: 2021).*

(Continued)

*Primary Examiner* — Taghi T Arani
*Assistant Examiner* — Joshua Raymond White
(74) *Attorney, Agent, or Firm* — Elliot J. Shine

(57) ABSTRACT

In some embodiments, a processor may store a value and a hash of the value in a ledger associated with a blockchain network. The processor may construct a block hash from the hash of the value. The processor may validate a transaction by identifying that the hash of the value matches the hash of the value from a previous transaction. The processor may maintain integrity of the block hash.

In some embodiments, a processor may provide a redact transaction for a blockchain network. The processor may initialize the redact transaction. The redact transaction may be associated with a validated transaction. The processor may identify a hash value indicated within the redact transaction and associated with the validated transaction. The processor may redact a value associated with the hash value.

16 Claims, 12 Drawing Sheets

(56) References Cited

OTHER PUBLICATIONS

River Financial "Preimage" [online] River Financial via Archive.org, Jan. 25, 2021 [retrieved Feb. 28, 2023]. Retrieved from the Internet: URL: https://web.archive.org/web/20210125141959/https://river.com/learn/terms/p/preimage/ (Year: 2021).*

Antonopoulos; Andreas "Mastering Bitcoin: Chapter 7. The Blockchain" [online] O'Reilly via Archive.org, Aug. 4, 2020 [retrieved Jun. 6, 2023]. Retrieved from the Internet: URL: https://web.archive.org/web/20200804150019/https://www.oreilly.com/library/view/mastering-bitcoin/9781491902639/ch07.html (Year: 2020).*

Ashritha, K., et al., "Redactable Blockchain using Enhanced Chameleon Hash Function," Published in 2019. 6 pages. 2019 5th International Conference on Advanced Computing & Communication Systems (ICACCS), pp. 323-328. Coimbatore, India.

Ateniese, G., et al., "Redactable Blockchain—or—Rewriting History in Bitcoin and Friends." Published Apr. 28, 2017. Accessed Jun. 11, 2020. 16 pages. Published by IEEE. Paris, France. https://ieeexplore.ieee.org/document/7961975.

Deuber, D., et al., "Redactable Blockchain in the Permissionless Setting." Published May 23, 2019. Accessed Jun. 11, 2020. 15 pages. Published by IEEE. San Francisco, CA., USA. https://ieeexplore.ieee.org/document/8835372.

Florian, M., et al., "Erasing Data from Blockchain Nodes," Published Apr. 18, 2019. 10 pages. 2019 IEEE European Symposium on Security and Privacy Workshops (EuroS&PW), pp. 367-376. Published by ARXIV. https://arxiv.org/abs/1904.08901.

Lee, N., et al., "Modifiable Public Blockchains Using Truncated Hashing and Sidechains," Published Nov. 28, 2019. 12 pages. IEEE Access 7, 2019, pp. 173571-173582. Published by IEEE Access. https://ieeexplore.ieee.org/ document/8917564.

Mell, et al., "The NIST Definition of Cloud Computing," Recommendations of the National Institute of Standards and Technology, U.S. Department of Commerce, Special Publication 800-145, Sep. 2011, 7 pgs.

* cited by examiner

REDACTABLE BLOCKCHAIN

BACKGROUND

The present disclosure relates generally to the field of information privacy, and more specifically to redacting information from a blockchain network.

Currently, under the General Data Protection Regulation (GDPR), any individual may contact an entity asking for their personal information to be deleted from all of the entity's systems within a certain time frame. However, many entities now utilizes some form of a blockchain network within their systems, and by nature, blockchain networks utilize immutable ledgers that permanently record information. Accordingly, an issue arises when an individual wishes to have their personal information redacted/expunged from an entity's systems.

Further, there is currently no adequate way to redact information from a blockchain network without corrupting the block where the information is stored. Traditionally, each block in the blockchain network includes a hash of a prior block, thus linking the blocks together to create a chain. Consequently, when content/information of a block is changed, the hash of the block is changed, and, therefore there is no way to attest validity of the block within the chain. Thus, deleting data directly from a ledger associated with the blockchain network is not possible because it will impact the ability to chain blocks together. As a result, there is a pressing need for a means to redact information from blockchain networks without corrupting the ability to continue to chain blocks together and to maintain validity of a block with redacted content/information.

SUMMARY

Embodiments of the present disclosure include a method, system, and computer program product for redacting information from a blockchain network. A processor may store a value and a hash of the value in a ledger associated with a blockchain network. The processor may construct a block hash from the hash of the value. The processor may validate a transaction by identifying that the hash of the value matches the hash of the value from a previous transaction. The processor may maintain integrity of the block hash.

In some embodiments, the processor may redact the value. The redacting of the value may include setting bits associated with the value to zero.

In some embodiments, redacting the value further includes maintaining the hash of the value and the block hash.

In some embodiments, redacting the value may further comprise the processor replacing the user date with the hash of the value. The processor may maintain a decoupled pre-image of the value.

In some embodiments, the hash of the value points to the decoupled pre-image.

In some embodiments, the processor may maintain the validated transaction without the value.

In some embodiments, the processor may receive the value. The processor may identify that the value is associated with user data. The processor may generate the hash of the value.

Further embodiments of the present disclosure include a method and system, for redacting information from a blockchain network. A processor may provide a redact transaction for the blockchain network. The processor may initialize the redact transaction. The redact transaction may be associated with a validated transaction. The processor may identify a hash value indicated within the redact transaction and associated with the validated transaction. The processor may redact a value associated with the hash value.

In some embodiments, the processor may generate a transaction envelope. The transaction envelope may include the hash value that contains a pointer to a pre-image.

In some embodiments, the transaction envelope may further include the pre-image and the pre-image may include the value.

In some embodiments, redacting the value may include setting bits associated with the value to zero. Setting the bits associated with the value to zero may allow the hash value to remain the same.

In some embodiments, the processor may maintain the validated transaction based on identifying that the hash value is the same after the redact transaction.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
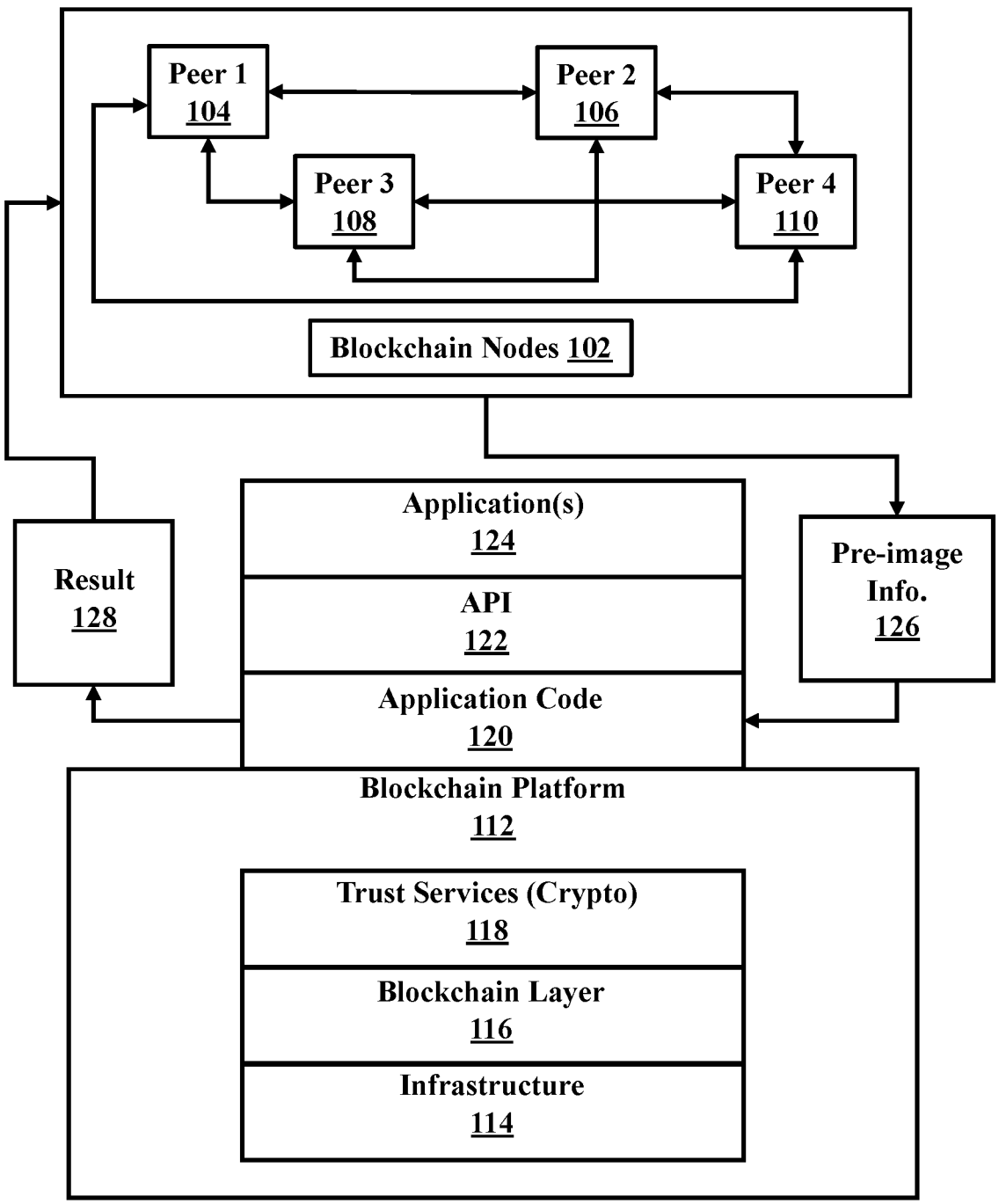
FIG. 1A illustrates an example blockchain architecture, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of information privacy, and more specifically to redacting information (e.g., user information, personal data, etc.) from a blockchain network. Many individuals like to be in control of there information (e.g., personal, private, or otherwise), and with the advent of the GDPR, individuals now have the right to be forgotten. With such a right, individuals may contact an entity (e.g., business, company, etc.) asking for their information to be deleted from the entity's systems within a certain timeframe. However, many entities now utilizes some form of a blockchain network within their systems, and by nature, blockchain networks utilize immutable ledgers that permanently record information. Accordingly, an issue arises when an individual wishes to have their personal information redacted/expunged from an entity's systems.

Currently, there are no options for redacting information from a blockchain network. The closest alternatives are private data collections, encryption, and off-chain storage with hashes on chain. However, each alternative does not actually redact information from a blockchain network and each alternative has its own drawbacks. For instance, private data collections: depend on Block-To-Live policies, which are time based (e.g., setting an expiration on a block); have performance penalties due to peers/nodes needing to pull private date upon a commit; and need to be designed up front to never put user data on chain, because once data is on a public chain it is impossible to get rid of. Additionally, encryption alternatives require key management overhead and forward secrecy is unclear in a budding quantum computing age. Lastly, off-chain storage with hashes on chain cause data distribution, and consistency and availability challenges in the case of multiple administrative domains. That is, overall, the key issue with each alternative is that they require add-ons that are not initially provided and therefore have to be implemented each time on a new blockchain, whereas disclosed herein is an inherent built-in solution for (permissioned) blockchains with an execute-order-validate architecture. Accordingly, there is a true need for a method, which is discussed herein this disclosure, that allows for information (as it relates to a specific user/individual) to be removed from a blockchain.

It will be readily understood that the instant components, as generally described and illustrated in the figures herein, may be arranged and designed in a wide variety of different configurations. Accordingly, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the FIGS., any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Detailed herein are a method, system, and computer program product that utilize adapted transaction envelopes that allow for the redacting of information from a blockchain network.

In some embodiment, the method, system, and/or computer program product utilize a decentralized database (such as a blockchain) that is a distributed storage system, which includes multiple nodes that communicate with each other. The decentralized database may include an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency.

In various embodiments, a permissioned and/or a permission-less blockchain can be used. In a public, or permission-less, blockchain, anyone can participate without a specific identity (e.g., retaining anonymity). Public blockchains can involve native cryptocurrency and use consensus based on various protocols such as Proof of Work. On the other hand, a permissioned blockchain database provides secure interactions among a group of entities which share a common goal but which do not fully trust one another, such as businesses that exchange funds, goods, (private) information, and the like.

Further, in some embodiment, the method, system, and/or computer program product can utilize a blockchain that operates arbitrary, programmable logic, tailored to a decentralized storage scheme and referred to as "smart contracts" or "chaincodes." In some embodiments, the method, system, and/or computer program product can further utilize smart contracts that are trusted distributed applications that leverage tamper-proof properties of the blockchain database and an underlying agreement between nodes, which is referred to as an endorsement or endorsement policy. Blockchain transactions associated with this application can be endorsed before being committed to the blockchain, while transactions, which are not endorsed, are disregarded.

An endorsement policy allows chaincode to specify endorsers for a transaction in the form of a set of peer nodes that are necessary for endorsement. When a client sends the transaction to the peers specified in the endorsement policy, the transaction is executed to validate the transaction. In some embodiments, the transaction is first simulated, e.g., endorsed to get consent from the peers to meet the endorsement policy. Then, the transaction enters an ordering phase in which a consensus protocol is used to produce an ordered sequence of endorsed transactions grouped into blocks. Further, in some embodiments, after the transaction goes into a block/blocks and reaches the peers, the transaction is validated.

In some embodiment, the method, system, and/or computer program product can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node).

Another type of node is a peer node which can receive client submitted transactions, commit the transactions, and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing/confirming transactions and modifying a world state of the blockchain, which is another name for the initial blockchain transaction which normally includes control and setup information.

In some embodiment, the method, system, and/or computer program product can utilize a ledger that is a sequenced, tamper-resistant record of all state transitions of a blockchain. State transitions may result from chaincode invocations (e.g., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

In some embodiment, the method, system, and/or computer program product described herein can utilize a chain that is a transaction log that is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (e.g., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Some benefits of the instant solutions described and depicted herein include a method, system, and computer program product for redacting (personal) information from a blockchain network. The exemplary embodiments provide a solution for protecting information on blockchain while maintaining the resiliency of the chain (e.g., the redacting of information does not cause an invalidation of a subsequent transaction).

It is noted that blockchain is different from a traditional database in that blockchain is not a central storage, but rather a decentralized, immutable, and secure storage, where nodes may share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the system described herein is implemented due to accountability, security, privacy, permitted decentralization, availability of smart contracts, endorsements and accessibility that are inherent and unique to blockchain.

In particular, the blockchain ledger data is traditionally immutable, which provides for an efficient method for identifying discrepancies in a blockchain network; the present disclosure provides a method, system, and computer program product for alleviating the discrepancies which would lead to subsequent invalidation of transactions (e.g., recording of data). Also, use of the encryption in the blockchain provides security and builds trust. The smart contract manages the state of assets to complete a life-cycle. The example blockchains are permission decentralized. Thus, each end user may have its own ledger copy to access. Multiple organizations (and peers) may be on-boarded on the blockchain network. The key organizations may serve as endorsing peers to validate the smart contract execution results, read-set and write-set.

One of the benefits of the example embodiments is that it improves the functionality of a computing system by implementing a method for redacting (personal/private/etc.) information from a blockchain network (e.g., by way of redacting information from a pre-image in a transaction envelope). Through the blockchain system described herein, a computing system (or a processor in the computing system) can perform functionality for redaction processing utilizing blockchain networks by providing access to capabilities such as distributed ledger, peers, encryption technologies, MSP, event handling, etc. Also, the blockchain enables to create a business network and make any users or organizations to on-board for participation. As such, the blockchain is not just a database. The blockchain comes with capabilities to create a network of users and on-board/off-board organizations to collaborate and execute service processes in the form of smart contracts (which may be associated with redaction processes and/or specific information to be redacted).

The example embodiments provide numerous benefits over a traditional database. For example, through the blockchain the embodiments provide for accountability, security, privacy, permitted decentralization, availability of smart contracts, endorsements and accessibility that are inherent and unique to the blockchain.

Meanwhile, a traditional database could not be used to implement the example embodiments because it does not bring all parties on the network, it does not create trusted collaboration and does not provide for an efficient storage of digital assets. The traditional database does not provide for a tamper proof storage and does not provide for preservation of the digital assets being stored. Thus, the proposed embodiments described herein utilizing blockchain networks cannot be implemented in the traditional database.

Meanwhile, if a traditional database were to be used to implement the example embodiments, the example embodiments would have suffered from unnecessary drawbacks such as search capability, lack of security and slow speed of transactions (e.g., by trying to identify redacted information discrepancies). Accordingly, the example embodiments provide for a specific solution to a problem in the arts/field of information redaction in a blockchain.

Turning now to FIG. 1A, illustrated is a blockchain architecture 100, in accordance with embodiments of the present disclosure. In some embodiments, the blockchain architecture 100 may include certain blockchain elements, for example, a group of blockchain nodes 102. The blockchain nodes 102 may include one or more blockchain nodes, e.g., peers 104-110 (these four nodes are depicted by example only). These nodes participate in a number of activities, such as a blockchain transaction addition and validation process (consensus). One or more of the peers 104-110 may endorse and/or recommend transactions based on an endorsement policy and may provide an ordering service for all blockchain nodes 102 in the blockchain architecture 100. A blockchain node may initiate a blockchain authentication and seek to write to a blockchain immutable ledger stored in blockchain layer 116, a copy of which may also be stored on the underpinning physical infrastructure 114. The blockchain configuration may include one or more applications 124 which are linked to application programming interfaces (APIs) 122 to access and execute stored program/application code 120 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 104-110.

The blockchain base or platform 112 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 116 may expose an interface that provides access to the virtual execution environment necessary to process the program code and engage the physical infrastructure 114. Cryptographic trust services 118 may be used to verify transactions such as asset exchange transactions and keep information private.

The blockchain architecture 100 of FIG. 1A may process and execute program/application code 120 via one or more interfaces exposed, and services provided, by blockchain platform 112. The application code 120 may control blockchain assets. For example, the application code 120 can store and transfer data, and may be executed by peers 104-110 in the form of a smart contract and associated chaincode with conditions or other code elements subject to its execution. As a non-limiting example, smart contracts may be created to execute the transfer of resources, the generation of resources, etc. The smart contracts can themselves be used to identify rules associated with authorization, access requirements (e.g., of a datastore, an off-chain datastore, a pre-image database, etc.), and/or usage of the ledger. For example, the pre-image information 126 may be processed by one or more processing entities (e.g., virtual machines) included in the blockchain layer 116. The result 128 may include a plurality of linked shared documents (e.g., with each linked shared document recording the issuance of a smart contract in regard to the pre-image information 126 being identified as either being allowed or denied validation, etc.). In some embodiments, the physical infrastructure 114 may be utilized to retrieve any of the data or information described herein.

A smart contract may be created via a high-level application and programming language, and then written to a block in the blockchain. The smart contract may include executable code which is registered, stored, and/or replicated with a blockchain (e.g., a distributed network of blockchain peers). A transaction is an execution of the smart contract code that can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details (e.g., thus confirming a contribution, identifying a discrepancy with a contribution, etc.).

Figure 1B:
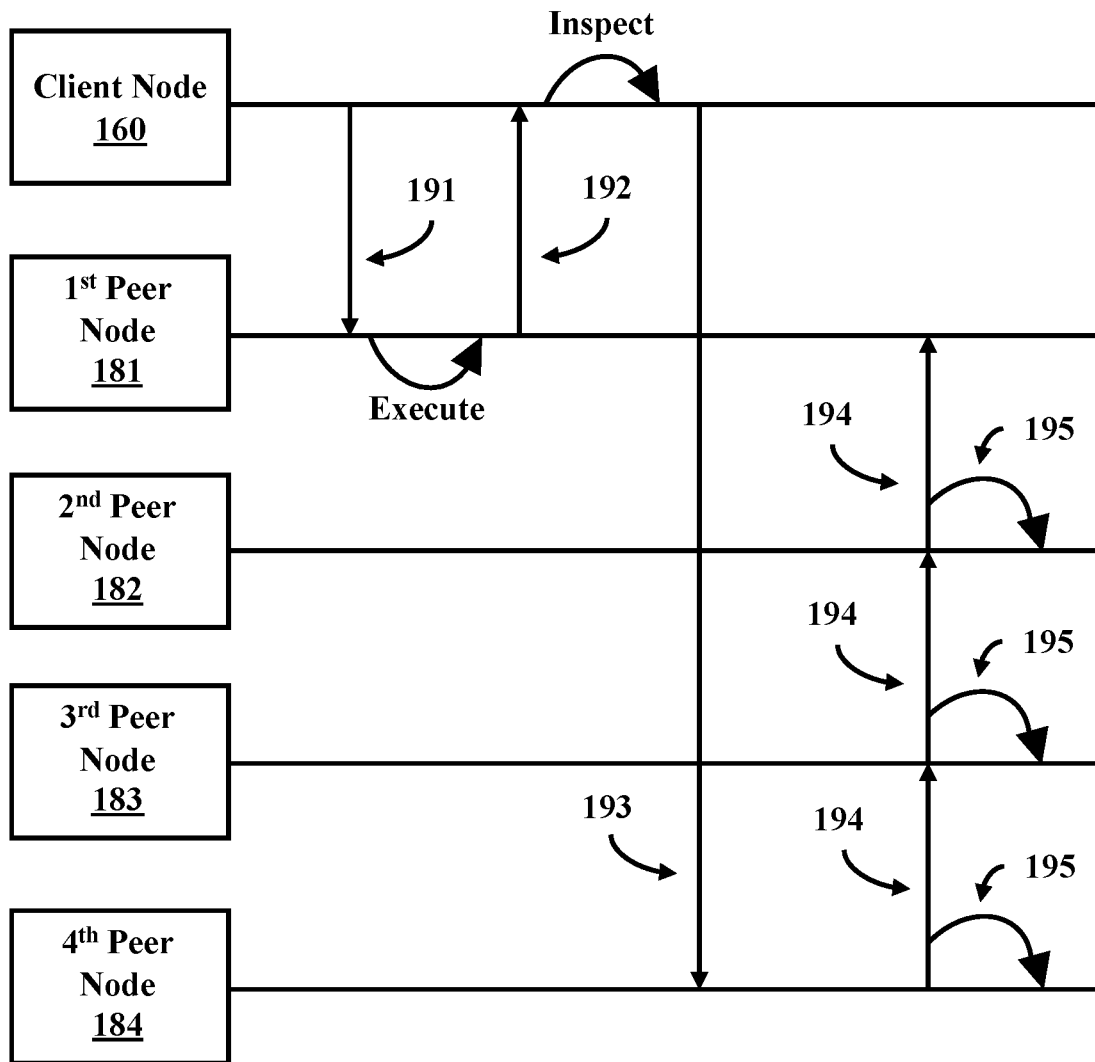
FIG. 1B illustrates a blockchain transactional flow, in accordance with embodiments of the present disclosure.

FIG. 1B illustrates an example of a blockchain transactional flow 150 between nodes of the blockchain in accordance with an example embodiment. Referring to FIG. 1B, the transaction flow may include a transaction proposal 191 sent by an application client node 160 to an endorsing peer node 181 (e.g., in some embodiments, the transaction proposal 191 may be a request that includes an identifier associated with an off-chain datastore/database). The endorsing peer 181 may verify the client signature and execute a chaincode function to initiate the transaction. The output may include the chaincode results, a set of key/value versions that were read in the chaincode (read set), and the set of keys/values that were written in chaincode (write set). The proposal response 192 is sent back to the client 160 along with an endorsement signature, if approved. The client 160 assembles the endorsements into a transaction payload 193 and broadcasts it to an ordering service node 184. The ordering service node 184 then delivers ordered transactions as blocks to all peers 181-183 on a channel. Before committal to the blockchain, each peer 181-183 may validate the transaction. For example, the peers may check the endorsement policy to ensure that the correct allotment of the specified peers have signed the results and authenticated the signatures against the transaction payload 193 (e.g., all, or a threshold number of peers, validate that the request includes the identifier and/or symmetric key that allows the finding of an datastore connection object and/or access to an off-chain database).

Referring again to FIG. 1B, the client node 160 initiates the transaction 191 by constructing and sending a request to the peer node 181, which is an endorser. The client 160 may include an application leveraging a supported software development kit (SDK), which utilizes an available API to generate a transaction proposal 191. The proposal is a request to invoke a chaincode function so that data can be read and/or written to the ledger (e.g., write new key value pairs for the assets). The SDK may reduce the package of the transaction proposal 191 into a properly architected format (e.g., protocol buffer over a remote procedure call (RPC)) and take the client's cryptographic credentials to produce a unique signature for the transaction proposal 191.

In response, the endorsing peer node 181 may verify (a) that the transaction proposal 191 is well formed, (b) the transaction has not been submitted already in the past (replay-attack protection), (c) the signature is valid, and (d) that the submitter (client 160, in the example) is properly authorized to perform the proposed operation on that channel. The endorsing peer node 181 may take the transaction proposal 191 inputs as arguments to the invoked chaincode function. The chaincode is then executed against a current state database to produce transaction results including a response value, read set, and write set. However, no updates are made to the ledger at this point. In some embodiments, the set of values, along with the endorsing peer node's 181 signature is passed back as a proposal response 192 to the SDK of the client 160 which parses the payload for the application to consume.

In response, the application of the client 160 inspects/verifies the endorsing peers signatures and compares the proposal responses to determine if the proposal response is the same. If the chaincode only queried the ledger, the application would inspect the query response and would typically not submit the transaction to the ordering node service 184. If the client application intends to submit the transaction to the ordering node service 184 to update the ledger, the application determines if the specified endorsement policy has been fulfilled before submitting (e.g., has a request been accepted). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in the transaction payload step 193, the client 160 assembles endorsements into a transaction and broadcasts the transaction proposal 191 and response within a transaction message to the ordering node 184. The transaction may contain the read/write sets, the endorsing peers signatures and a channel ID. The ordering node 184 does not need to inspect the entire content of a transaction in order to perform its operation, instead the ordering node 184 may simply receive transactions from all channels in the network, order them chronologically by channel, and create blocks of transactions per channel.

The blocks of the transaction are delivered from the ordering node 184 to all peer nodes 181-183 on the channel. The transactions 194 within the block are validated to ensure any endorsement policy is fulfilled and to ensure that there have been no changes to ledger state for read set variables since the read set was generated by the transaction execution. Transactions in the block are tagged as being valid or invalid. Furthermore, in steps 195 each peer node 181-183 appends the block to the channel's chain, and for each valid transaction the write sets are committed to current state database. An event is emitted, to notify the client application that the transaction (invocation) has been immutably appended to the chain, as well as to notify whether the transaction was validated or invalidated (e.g., whether the request is allowed, or denied, access to an off-chain datastore).

Figure 2:
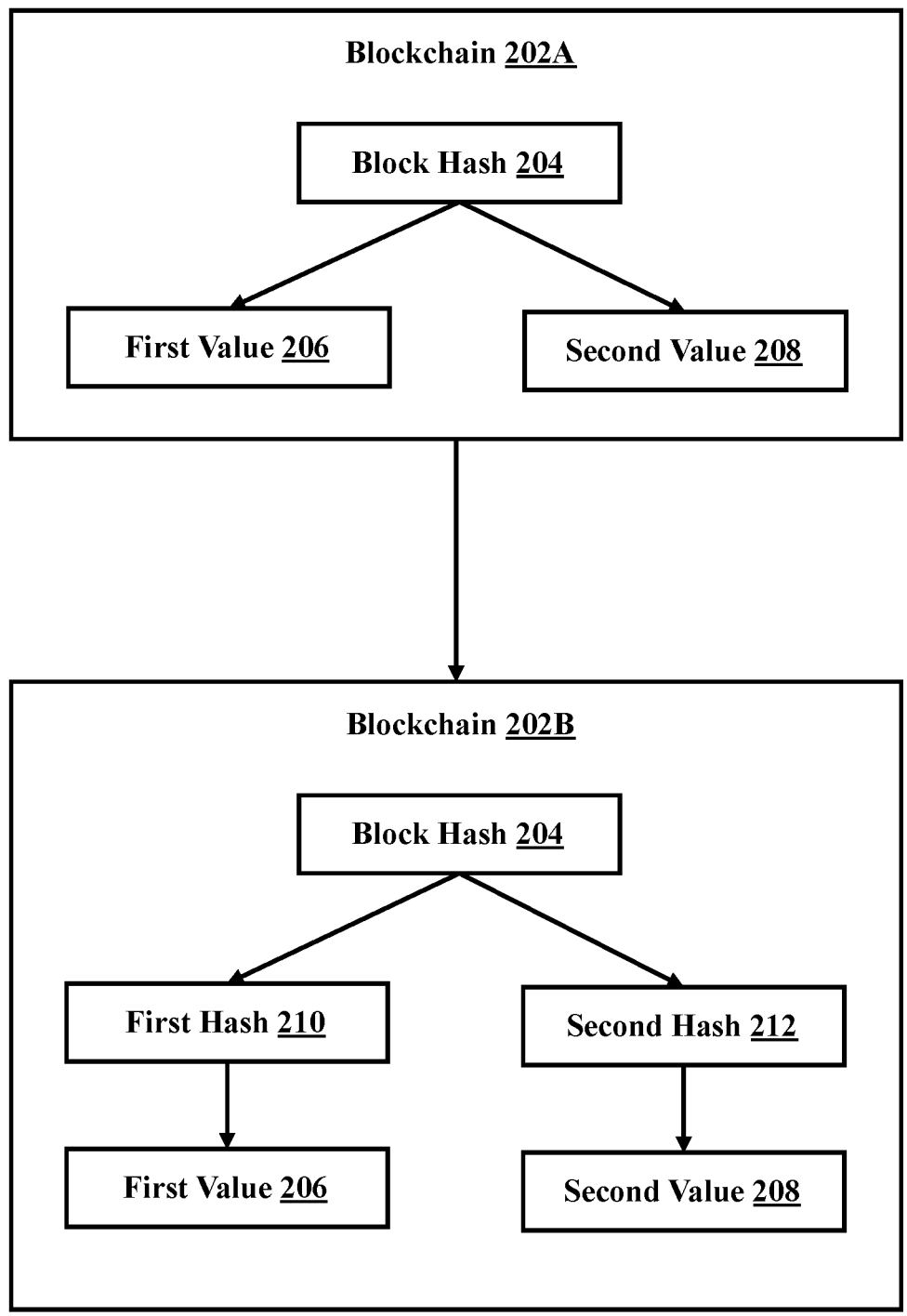
FIG. 2 illustrates a traditional blockchain being transitioned to an redactable blockchain, in accordance with embodiments of the present disclosure.

Referring now to FIG. 2, illustrated a traditional blockchain 202A being transitioned to an redactable blockchain 202B, in accordance with embodiments of the present disclosure. It is noted that like reference numerals are used to designate like parts in the accompanying drawings. As depicted, the traditional blockchain 202A includes a block hash 204, which is a hash of a block header and acts as a reference number for a block (not depicted) in the traditional blockchain 202A. The block hash 204 traditionally is associated with (e.g., references, points to, etc.) a first value 206 and/or a second value 208. In some embodiments, the first value 206 and/or the second value 208 may be values associate with transactions involving information. In such an instance, the information is immutably stored on the traditional blockchain 202A.

In order to allow for the redaction of the first value 206 and/or second value 208, the present disclosure provides that the traditional blockchain 202A is transitioned to the redactable blockchain 202B by hashing the first value 206 and/or the second value 208. The hashing of the first value 206 and/or the second value 208 generates the respective first hash 210 and/or the second hash 212, which is now associated with the block hash 204. In such an instance, and to be discussed more fully below, the first value 206 and/or the second value 208 can now be redacted without invalidating block hash 204 or the block referenced by the block hash 204 as the first hash 210 and/or the second hash 212 are effectively the first value 206 and the second value 208 in the traditional blockchain 204 and will not change. It is noted that the traditional blockchain 202A and the redactable blockchain 202B are the same blockchain, but with a structural alteration.

Figure 3A:
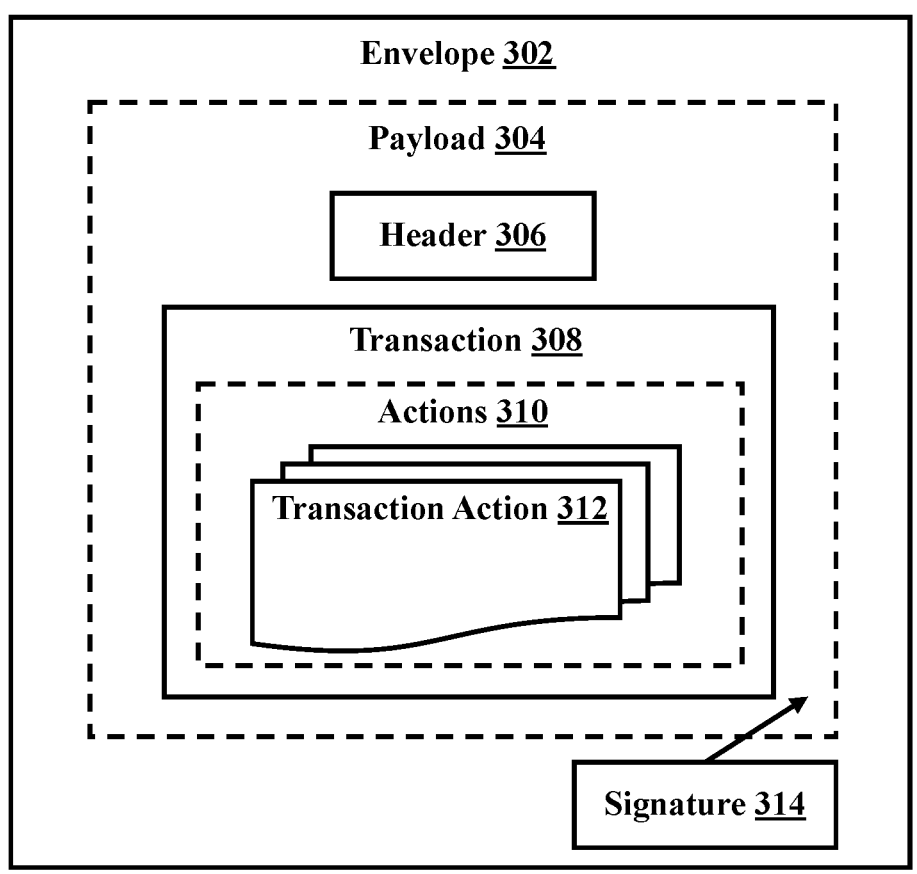
FIG. 3A illustrates a traditional transaction initiation, in accordance with embodiments of the present disclosure.

Referring now to FIG. 3A, illustrated is a traditional transaction initiation 300A, in accordance with embodiments of the present disclosure. As depicted, the traditional transaction 300A includes an envelope 302 that includes a payload 304 and signature 314 that is over the payload 304. The payload 304 includes a header 306 that includes destination information (e.g., identifying where assets of the transaction should be sent, etc.). The payload 304 further includes a transaction 308 that includes actions 310. The transaction actions 310 include instructions, which are depicted as transaction action 312, but it is noted that more than one instruction can be included in the transaction 308 (e.g., pull information from database x and store information in database y, etc.). The transaction action 312 can store information/data associated with a user and/or include the block hash 204 as depicted in FIG. 2.

In some embodiments, the signature 314 evidences the consenting of results of the execution of the actions 310 of the transaction 308 (e.g., evidencing the pulling of information from database X, etc.) and which allows commitment to a blockchain. In some embodiments, if signature 314 is not received, the transaction 308 is invalidated and/or rejected, which can be the case when information in the transaction actions 312 do not match. For example, if a transaction is validated with a user name in the payload 304 and it is committed to the blockchain, each peer in the blockchain now has the user name on their copy of the blockchain ledger. Then, if the user name is removed from the transaction, and a new peer joins the blockchain, the peers in the blockchain prior to the removal of the user name will identify that the transaction no longer aligns and the transaction is rejected.

Figure 3B:
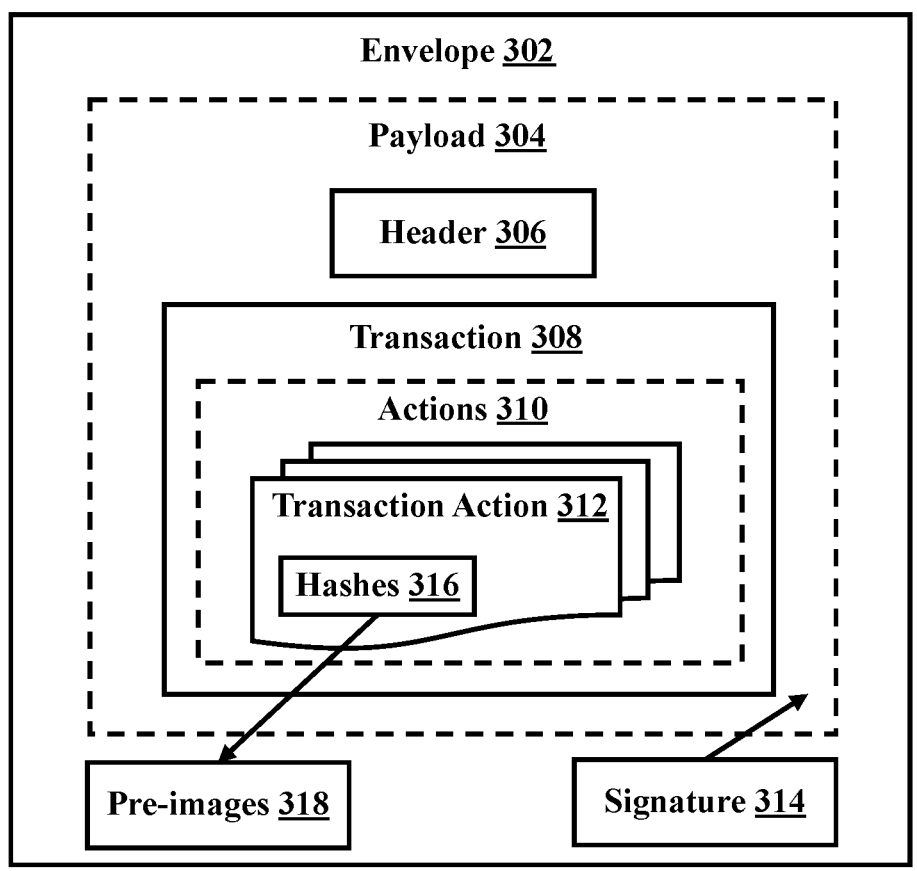
FIG. 3B illustrates an updated transaction initiation, in accordance with embodiments of the present disclosure.

Referring now to FIG. 3B, illustrated is an updated transaction initiation 300B, in accordance with embodiments of the present disclosure. It is noted that the updated transaction initiation 300B includes the same components that are included in the traditional transaction initiation 300A, but further include hashes 316 that are associated with and point (e.g., includes a pointer) to pre-images 318 that are decoupled from the payload 304. The pre-images 318 are any information/values that are needed to be used for the transaction 308, but because the hashes 316 are in the transaction action 312, the values of the hashes 316 are used and the pre-images 318 are never exposed to the blockchain (e.g., user data is never used in validation logic). Further, the pre-images 318 can be deleted/redacted from the envelope 302 and will not invalidate the transaction because the hashes 316 replace the values and the transaction validation is indifferent to the content of the values associated with the hashes 316. It is noted that what is described herein is functionally achievable because during validation of a transaction the validation only has concern for versions of a key/keys (e.g., a key/keys associated with the hashes 316) and adherence to an endorsement policy, thus allowing for the deletion of the pre-images 318.

Figure 4:
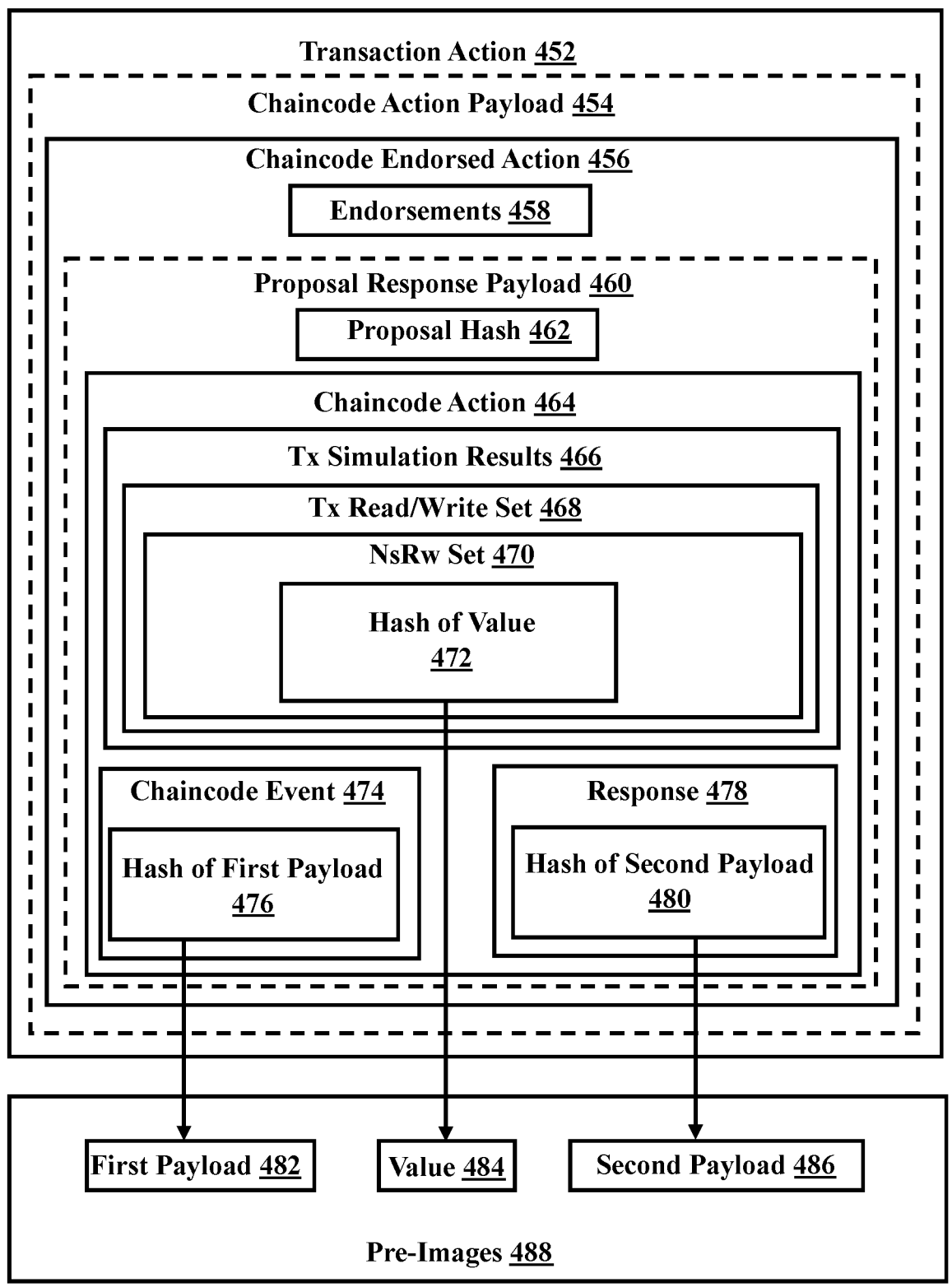
FIG. 4 illustrates a transaction structure for allowing redaction of information, in accordance with embodiments of the present disclosure.

Referring now to FIG. 4, illustrated is a transaction structure 400 for allowing redaction of information, in accordance with embodiments of the present disclosure. In some embodiments the transaction structure 400 may be the structure used by the actions 310 of FIGS. 3A and 3B. In some embodiments the transaction structure 400 includes transaction action 452, which could be the transaction action 312 of FIGS. 3A and 3B. As depicted, the transaction action 452 includes chaincode action payload 454, which includes chaincode endorsed action 456. The chaincode endorsed action 456 includes endorsements 458, which may be signatures/validations/allowances/etc. indicating that a transaction associated with the transaction action 452 can proceed and/or be committed to the blockchain.

Further depicted, the chaincode endorsed action 456 includes a proposal response payload 460, which includes a proposal hash 462 that may be associated with the information being proposed to be added to the blockchain. The proposal response payload 460 may further include chaincode action 464 that may detail how/where the information regarding the transaction should be stored on the blockchain. In some embodiments, the chaincode action 464 includes transaction (Tx) simulation results 466 that includes transaction read/write set 468. Transaction read write set 468 includes nextstep (Ns) read/write (Rw) set 470 that includes a hash of (a) value 472 that points to and is associated with value 484, which may be information/data/content.

In some embodiments, the chaincode action 464 further includes chaincode event 474 that includes a hash of (a) first payload 476 that points to and is associated with a first payload 482, which may include sensitive information. In some embodiments, the chaincode action 464 further includes a response 478 that includes a hash of (a) second payload 480 that points to and is associated with a second payload 486, which may be further information that a user may want to be redactable. In some embodiments, the hash of the value 472, the hash of the first payload 476 and the hash of the second payload 480 may all point to and be associated with the same information (e.g., the value 484, the first payload 482, or the second payload 486).

It is noted that the value 484, the first payload 482, and the second payload 486 are stored in a decoupled area of the transaction structure 400 in the pre-images 488, where the value 484, the first payload 482, and the second payload 486 can be fully viewed, but which are not exposed to a blockchain during the transaction associated with the transaction structure 400.

Figure 5:
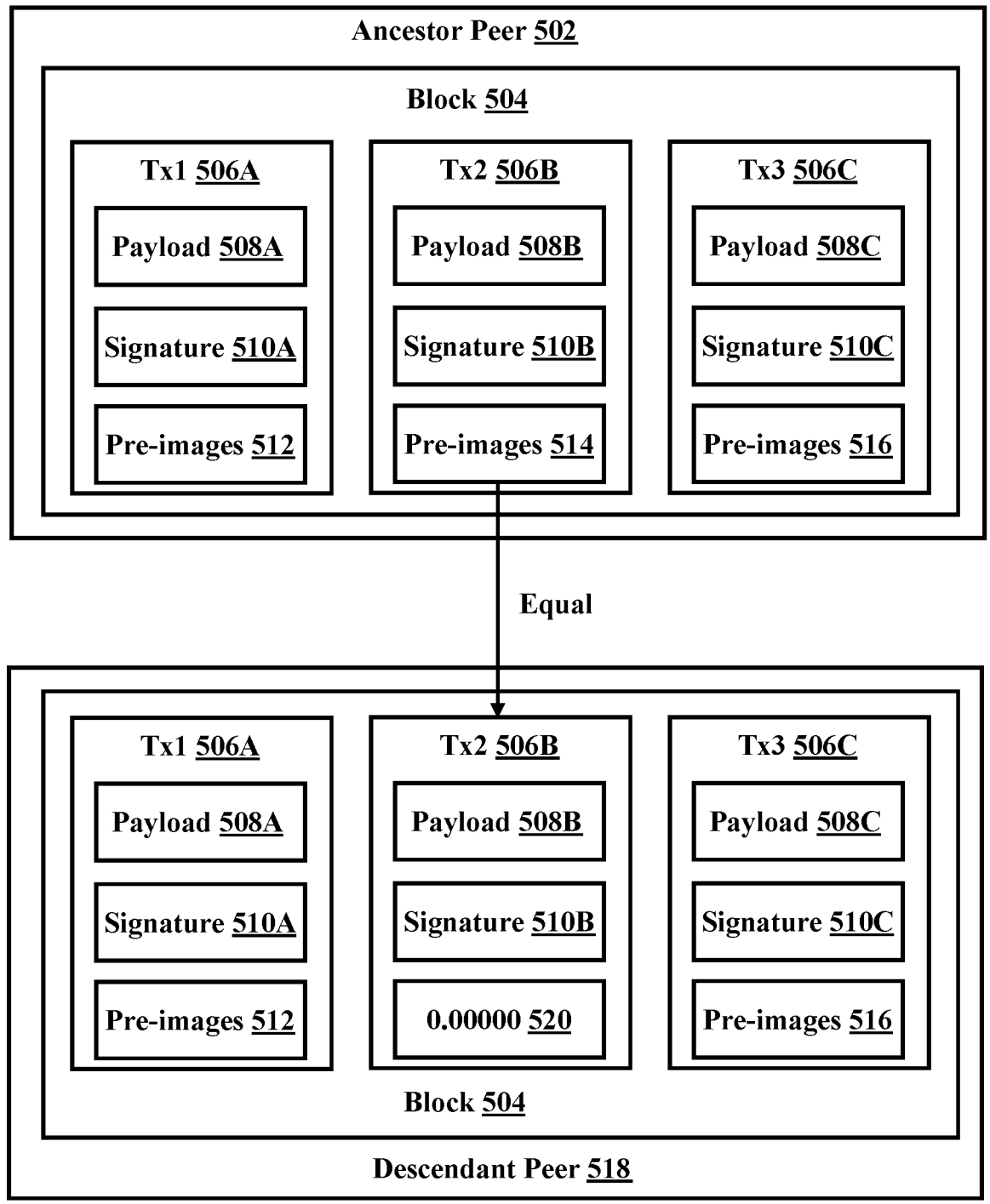
FIG. 5 illustrates a validation of a transaction by a descendant peer, in accordance with embodiments of the present disclosure.

Referring now to FIG. 5, illustrated is a validation 500 of a transaction by a descendant peer 518, in accordance with embodiments of the present disclosure. As depicted, an ancestor peer 502 includes a block 504 that includes transactions (Tx) 506A-C (e.g., validated transactions), where the block 504 is stored on the ancestor peer 502 via a blockchain in communication with the ancestor peer 502 committing the transactions 506A-C to the blockchain. In some embodiments, each of the transactions 506A-C respectively include payloads 508A-C and signatures 510A-C, where transaction one 506A includes pre-images 512, transaction two 506B includes pre-images 514, and transaction three 506C includes pre-images 516. In some embodiments, each of the pre-images 512-516 may actually be hashes of the pre-images 512-516 or be pulled into the transactions 506A-C via hashes pointing to the pre-images 512-516, but for clarity the hashes are not depicted.

In some embodiments, the descendant peer 518 may be onboarded to the blockchain and receive a copy of the blockchain ledger, including block 504, or, in some embodiments the descendent peer 518 may be the ancestor peer 502 and the block 504 may be updated after a fourth (subsequent) transaction. In either case, the pre-images 514 are replaced by zeroes 520 (e.g., the values associated with the pre-images 514 become zeroes via a redact transaction of the pre-images 514), thus appearing redacted to/in the block 504. The replacing of the pre-images 514 with the zeroes 520 allow transaction two 506B to remain valid. That is, the reliance on the hashes while computing a hash chain, and not relying on the pre-images 514, allows for the continued validation of transaction two 506B and of the hash chain (after redaction).

As provided in this disclosure and depicted in FIG. 5, information can be redacted from the blockchain without invalidating a transaction and maintaining block hash integrity (e.g., allowing for the continued chaining/linking of blocks), which continues to allow for the blockchain to immutably confirm the existence of a transaction. Additionally, it is noted that a transaction with a mismatched hash/pre-image marks all keys in its write-set as ruined and a subsequent (e.g., transaction) reading of a ruined key during chaincode execution results in an instant termination of the transaction. Usually orderers validate hashes and reject transactions with mismatching hashes/pre-images, which is required to prevent a fork between a transaction with mismatched hashes/pre-images (e.g., values) and the same transaction after redaction. Thus the embodiments disclosed herein provide a way for redaction with crippling any keys or causes forks in the same transaction.

Figure 6A:
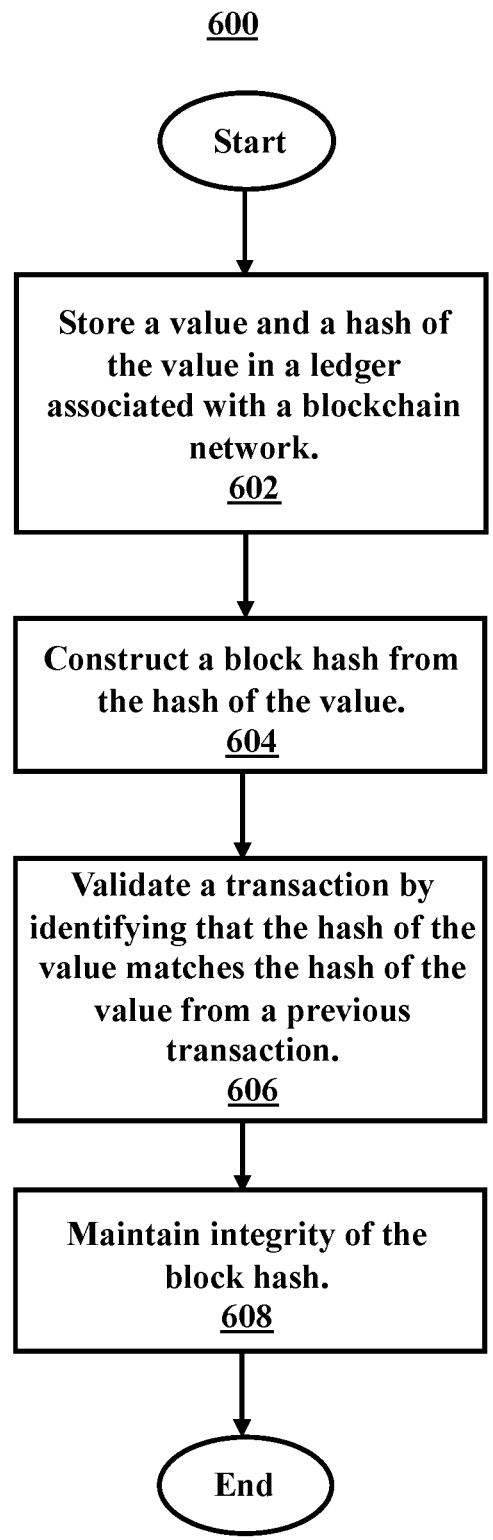
FIG. 6A illustrates a flowchart of an example method for maintaining block hash integrity in a blockchain network, in accordance with embodiments of the present disclosure.

Referring now to FIG. 6A, illustrated is a flowchart of an example method 600 for maintaining block hash integrity, in accordance with embodiments of the present disclosure. In some embodiments, the method 600 may be performed by a processor (e.g., peer/node in a blockchain, in a system, etc.). In some embodiments, the method 600 begins at operation 602, where the processor stores a value and a hash of the value in a ledger associated with the blockchain network.

In some embodiments, the method 600 proceeds to operation 604, where the processor constructs a block hash from the hash of the value. In some embodiments, the method 600 proceeds to operation 606. At operation 606, the processor validates a transaction by identifying that the hash of the value matches the hash of the value from a previous transaction (or, in some embodiments, the on-boarding of a new peer). In some embodiments, the method 600 proceeds to operation 608, where the processor maintains integrity of the block hash (e.g., there is no fork between a transaction with mismatched hashes of the same transaction after redaction therefore the transaction is not invalidated, and which allows for the continued chaining/linking of blocks). In some embodiments, the method 600 may end.

In some embodiments, discussed below, there are one or more operations of the method 600 not depicted for the sake of brevity. Accordingly, in some embodiments, the method 600 may further include the processor redacting the value. In such an embodiment, the redacting of the transaction may include setting bits associated with the value to zero. In some embodiments, the method 600 may be performed after a redaction of the value and/or redaction of information (e.g., user data, personal information, etc.) associated with the value.

In some embodiments, the redacting of the value may further include maintaining the hash of the value of and the block hash. In some embodiments, redacting the value may further comprise the processor replacing the value with the hash of the value. The processor may further maintain a decoupled pre-image of the value. In some embodiments, the hash of the value may point to the decoupled pre-image.

In some embodiments, the method 600 may further comprise the processor maintaining the validated transaction without the value (e.g., the transaction remains valid due to the hash of the value being recorded to the ledger and remaining immutable and unchanging, even if the value is redacted). In some embodiments, the method 600 may further comprise the processor receiving the value. The processor may identify that the value is associated with user data. The processor may then generate the hash of the value (e.g., the processor identifies the value is associated with a specific type of data/information and then a hash is generated for the value and the proposed blockchain structure as discussed and depicted throughout this disclosure is generated).

Figure 6B:
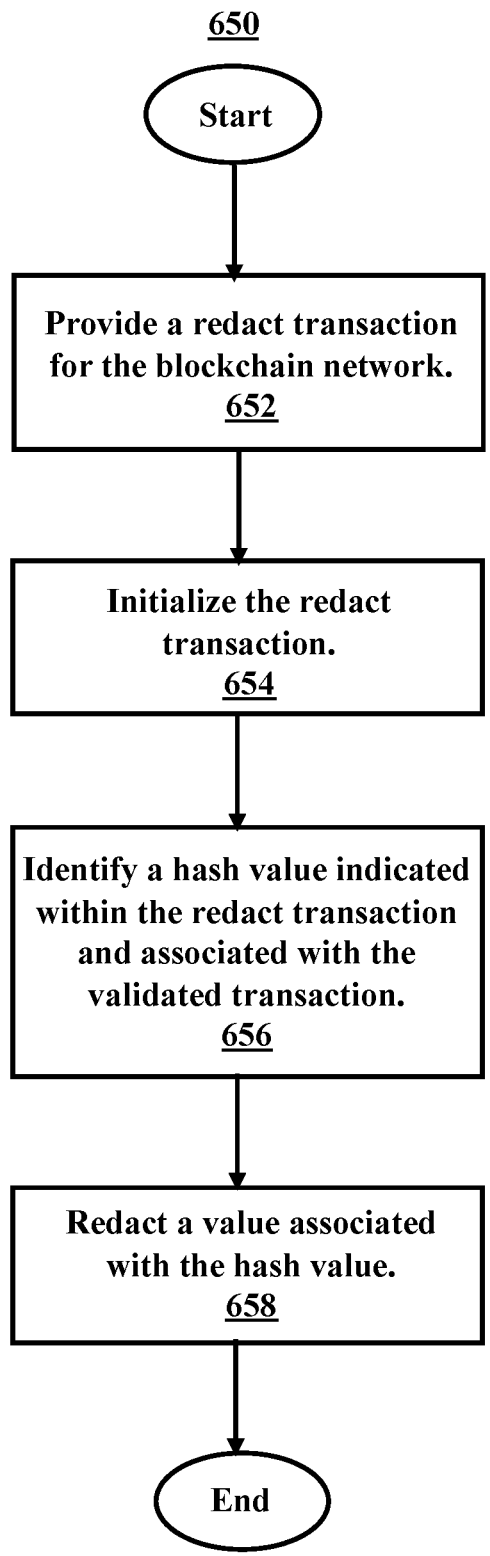
FIG. 6B illustrates a flowchart of an example method for redacting information from a blockchain network, in accordance with embodiments of the present disclosure.

Referring now to FIG. 6B, illustrated is a flowchart of an example method 650 for redacting information from a blockchain network, in accordance with embodiments of the present disclosure. In some embodiments, the method 650 may be performed by a processor (e.g., peer/node in a blockchain, in a system, etc.). In some embodiments, the method 650 begins at operation 652, where the processor provides a redact transaction for the blockchain network.

In some embodiments, the method 650 proceeds to operation 654, where the processor initializes the redact transaction. The redact transaction may be associated with a validated transaction. In some embodiments, the method 650 proceeds to operation 656. At operation 656, the processor identifies a hash value indicated within the redact transaction and associated with the validated transaction. In some embodiments the method 650 proceeds to operation 658, where the processor redacts a value associated with the hash value. In some embodiments, the method 650 may end after operation 658.

In some embodiments, discussed below, there are one or more operations of the method 650 not depicted for the sake of brevity. Accordingly, in some embodiments, the method 650 may further include the processor generating a transaction envelope. In some embodiments, the transaction envelope may include the hash value that contains a pointer to a pre-image. In some embodiments, the transaction envelope may further include the pre-image and the pre-image may include the value.

In some embodiments, redacting the value may include setting bits associated with the value to zero. In such an instance, setting the bits associated with the value to zero may allow the hash value to remain the same (e.g., unchanged, etc.). In some embodiments, the method 650 may further include the processor maintaining the validated transaction based on identifying that the hash value is the same after the redact transaction.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multitenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7A:
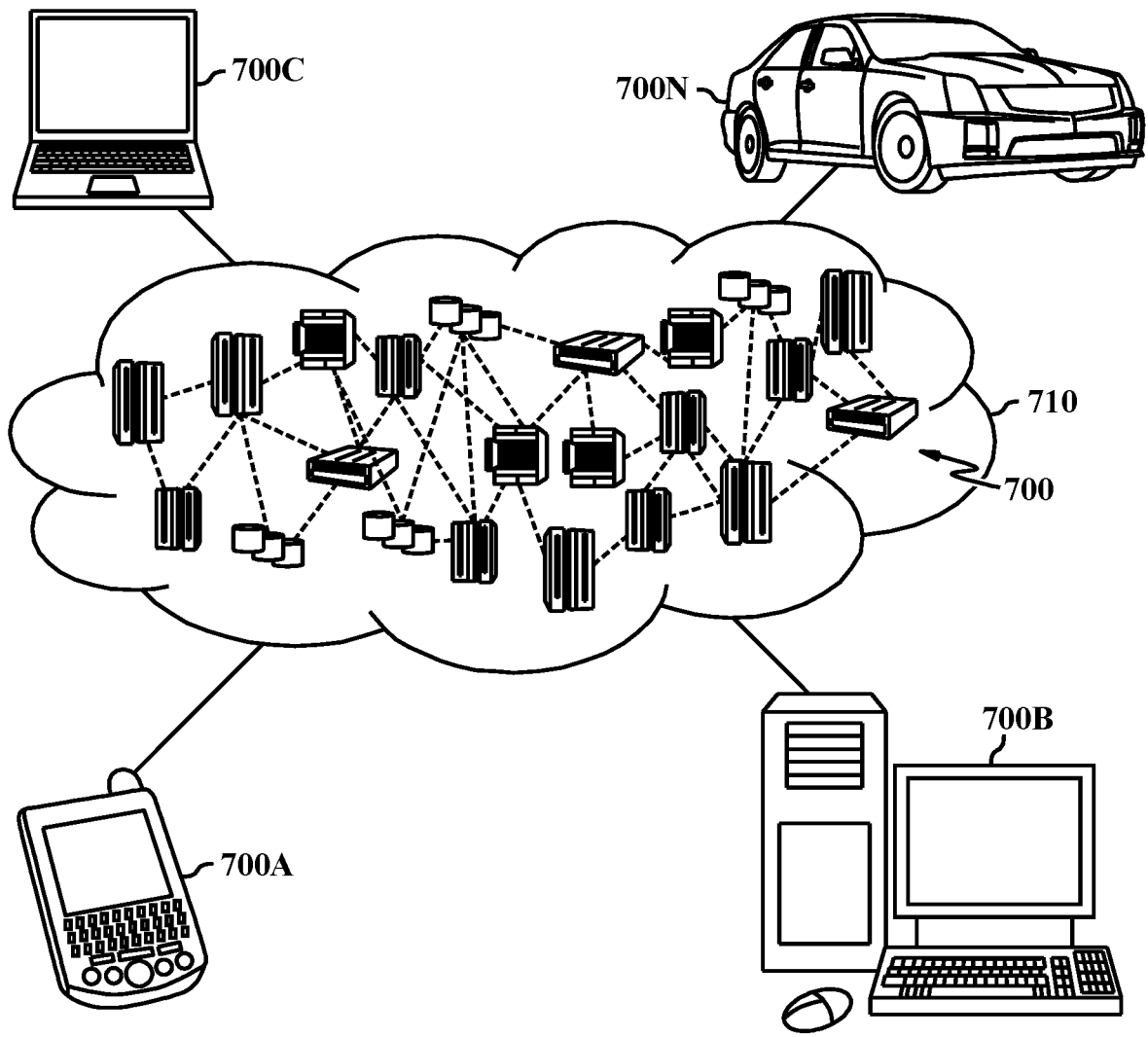
FIG. 7A illustrates a cloud computing environment, in accordance with embodiments of the present disclosure.

FIG. 7A, illustrated is a cloud computing environment 710 is depicted. As shown, cloud computing environment 710 includes one or more cloud computing nodes 700 with which local computing devices used by cloud consumers, such as, for example, personal digital assistant (PDA) or cellular telephone 700A, desktop computer 700B, laptop computer 700C, and/or automobile computer system 700N may communicate. Nodes 700 may communicate with one another. They may be grouped (not shown) physically or virtually, in one or more networks, such as Private, Community, Public, or Hybrid clouds as described hereinabove, or a combination thereof.

This allows cloud computing environment 710 to offer infrastructure, platforms and/or software as services for which a cloud consumer does not need to maintain resources on a local computing device. It is understood that the types of computing devices 700A-N shown in FIG. 7A are intended to be illustrative only and that computing nodes 700 and cloud computing environment 710 can communicate with any type of computerized device over any type of network and/or network addressable connection (e.g., using a web browser).

Figure 7B:
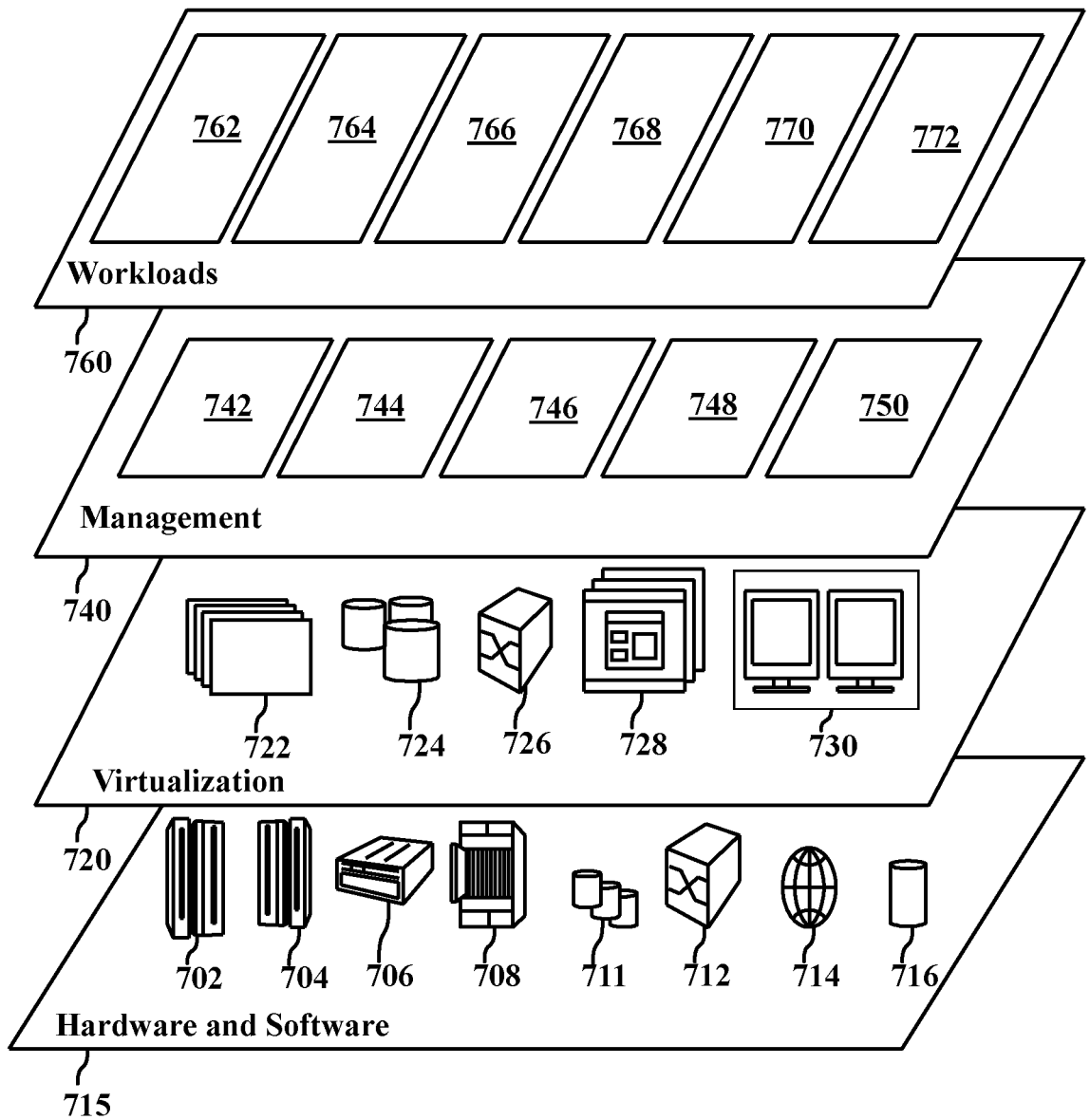
FIG. 7B illustrates abstraction model layers, in accordance with embodiments of the present disclosure.

FIG. 7B, illustrated is a set of functional abstraction layers provided by cloud computing environment 710 (FIG. 7A) is shown. It should be understood in advance that the components, layers, and functions shown in FIG. 7B are intended to be illustrative only and embodiments of the disclosure are not limited thereto. As depicted below, the following layers and corresponding functions are provided.

Hardware and software layer 715 includes hardware and software components. Examples of hardware components include: mainframes 702; RISC (Reduced Instruction Set Computer) architecture based servers 704; servers 706; blade servers 708; storage devices 711; and networks and networking components 712. In some embodiments, software components include network application server software 714 and database software 716.

Virtualization layer 720 provides an abstraction layer from which the following examples of virtual entities may be provided: virtual servers 722; virtual storage 724; virtual networks 726, including virtual private networks; virtual applications and operating systems 728; and virtual clients 730.

In one example, management layer 740 may provide the functions described below. Resource provisioning 742 provides dynamic procurement of computing resources and other resources that are utilized to perform tasks within the cloud computing environment. Metering and Pricing 744 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 746 provides access to the cloud computing environment for consumers and system administrators. Service level management 748 provides cloud computing resource allocation and management such that required service levels are met. Service Level Agreement (SLA) planning and fulfillment 750 provide pre-arrangement for, and procurement of, cloud computing resources for which a future requirement is anticipated in accordance with an SLA.

Workloads layer 760 provides examples of functionality for which the cloud computing environment may be utilized. Examples of workloads and functions which may be provided from this layer include: mapping and navigation 762; software development and lifecycle management 764; virtual classroom education delivery 766; data analytics processing 768; transaction processing 770; and redact transaction processing 772.

Figure 8:
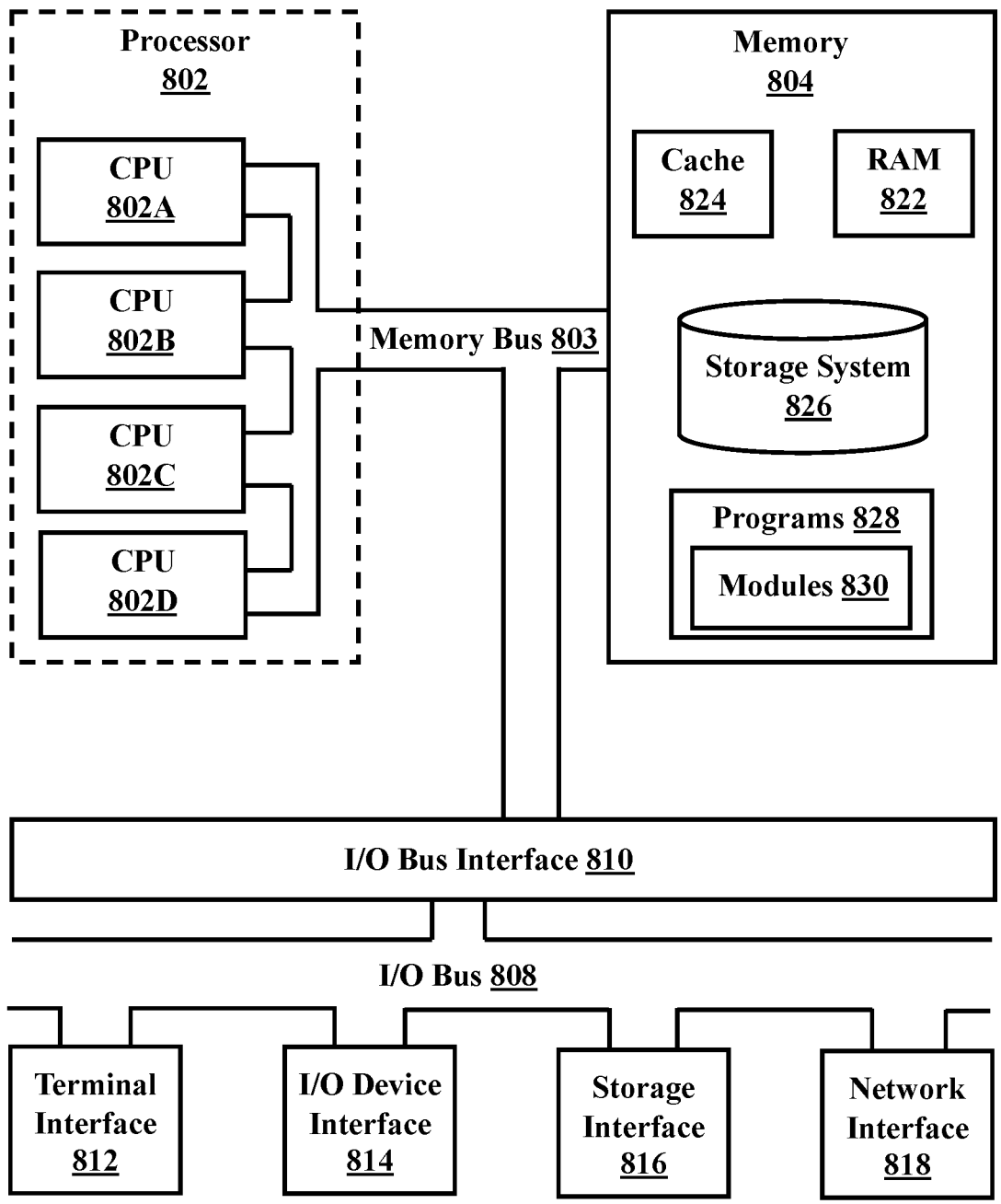
FIG. 8 illustrates a high-level block diagram of an example computer system that may be used in implementing one or more of the methods, tools, and modules, and any related functions, described herein, in accordance with embodiments of the present disclosure.

FIG. 8, illustrated is a high-level block diagram of an example computer system 801 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 801 may comprise one or more CPUs 802, a memory subsystem 804, a terminal interface 812, a storage interface 816, an I/O (Input/Output) device interface 814, and a network interface 818, all of which may be communicatively coupled, directly or indirectly, for inter-component communication via a memory bus 803, an I/O bus 808, and an I/O bus interface unit 810.

The computer system 801 may contain one or more general-purpose programmable central processing units (CPUs) 802A, 802B, 802C, and 802D, herein generically referred to as the CPU 802. In some embodiments, the computer system 801 may contain multiple processors typical of a relatively large system; however, in other embodiments the computer system 801 may alternatively be a single CPU system. Each CPU 802 may execute instructions stored in the memory subsystem 804 and may include one or more levels of on-board cache.

System memory 804 may include computer system readable media in the form of volatile memory, such as random access memory (RAM) 822 or cache memory 824. Computer system 801 may further include other removable/non-removable, volatile/non-volatile computer system storage media. By way of example only, storage system 826 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 804 can include flash memory, e.g., a flash memory stick drive or a flash drive. Memory devices can be connected to memory bus 803 by one or more data media interfaces. The memory 804 may include at least one program product having a set (e.g., at least one) of program modules that are configured to carry out the functions of various embodiments.

One or more programs/utilities 828, each having at least one set of program modules 830 may be stored in memory 804. The programs/utilities 828 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 828 and/or program modules 830 generally perform the functions or methodologies of various embodiments.

Although the memory bus 803 is shown in FIG. 8 as a single bus structure providing a direct communication path among the CPUs 802, the memory subsystem 804, and the I/O bus interface 810, the memory bus 803 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 810 and the I/O bus 808 are shown as single respective units, the computer system 801 may, in some embodiments, contain multiple I/O bus interface units 810, multiple I/O buses 808, or both. Further, while multiple I/O interface units are shown, which separate the I/O bus 808 from various communications paths running to the various I/O devices, in other embodiments some or all of the I/O devices may be connected directly to one or more system I/O buses.

In some embodiments, the computer system 801 may be a multi-user mainframe computer system, a single-user system, or a server computer or similar device that has little or no direct user interface, but receives requests from other computer systems (clients). Further, in some embodiments, the computer system 801 may be implemented as a desktop computer, portable computer, laptop or notebook computer, tablet computer, pocket computer, telephone, smartphone, network switches or routers, or any other appropriate type of electronic device.

It is noted that FIG. 8 is intended to depict the representative major components of an exemplary computer system 801. In some embodiments, however, individual components may have greater or lesser complexity than as represented in FIG. 8, components other than or in addition to those shown in FIG. 8 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method, the method comprising:

storing one or more values and one or more respective hashes of the one or more values in a ledger associated with a blockchain network, wherein the one or more values and the one or more respective hashes are stored within a block, wherein the block is a same blockchain block;

constructing a block hash from the one or more respective hashes of the one or more values, wherein the block hash is a hash of a block header and acts as a reference number for a reference block;

validating a transaction by identifying that a respective hash of a value matches the respective hash of the value from a previous transaction;

maintaining integrity of the block hash;

redacting at least one value stored within the block corresponding to the block hash, wherein redacting the at least one value includes setting bits associated with the at least one value to zero and maintaining the respective hash of the value and the block hash for the block.

2. The method of claim 1, wherein redacting the value further comprises:
replacing the value with the respective hash of the value; and
maintaining a decoupled pre-image of the value.

3. The method of claim 2, wherein the respective hash of the value points to the decoupled pre-image.

4. The method of claim 1, further comprising:
maintaining the validated transaction without the value.

5. The method of claim 1, further comprising:
receiving the value;
identifying that the value is associated with user data; and
generating the respective hash of the value.

6. The method of claim 2, wherein maintaining the decoupled pre-image of the value further comprises:
generating a transaction envelope, wherein the transaction envelope includes the respective hash of the value that contains a pointer to the decoupled pre-image and the decoupled pre-image including the value.

7. The method of claim 1, further comprising:
maintaining the validated transaction in a single block entry, the single block entry corresponding to the block hash, based on identifying that the respective hash of the value is the same after the redacting.

8. The method of claim 1, wherein redacting the value further comprises:
initializing a redact transaction, wherein the redact transaction is associated with the transaction previously validated;
identifying the respective hash and the value associated with the respective hash; and
redacting the value associated with the hash value for the block corresponding to the block hash.

9. The method of claim 1, wherein the value is redacted using the block corresponding to the block hash, wherein the block for which the transaction is validated.

10. The method of claim 1, wherein the at least one value being redacted is either a first value or a second value, wherein the first value corresponds to a first hash and the second value corresponds to a second hash, wherein the first hash and the second hash are associated with the block corresponding to the block hash.

11. The method of claim 1, wherein the at least one value being redacted is a first value and a second value, wherein the first value corresponds to a first hash and the second value corresponds to a second hash, wherein the first hash and the second hash are associated with the block corresponding to the block hash.

12. A system, the system comprising:
a memory; and
a processor in communication with the memory, the processor being configured to perform operations comprising:
storing one or more values and one or more respective hashes of the one or more values in a ledger associated with a blockchain network, wherein the one or more values and the one or more respective hashes are stored within a block, wherein the block is a same blockchain block;
constructing a block hash from the one or more respective hashes of the one or more values, wherein the block hash is a hash of a block header and acts as a reference number for a reference block;
validating a transaction by identifying that a respective hash of a value matches the respective hash of the value from a previous transaction;
maintaining integrity of the block hash;
redacting at least one value stored within the block corresponding to the block hash, wherein redacting the at least one value includes setting bits associated with the at least one value to zero and maintaining the respective hash of the value and the block hash for the block.

13. The system of claim 12, wherein redacting the value further comprises:
replacing the value with the respective hash of the value; and
maintaining a decoupled pre-image of the value.

14. The system of claim 13, wherein the respective hash of the value points to the decoupled pre-image.

15. A computer program product, the computer program product comprising a computer readable storage medium having program instructions embodied therewith, the program instructions executable by a processor to cause the processors to perform a function, the function comprising:
storing one or more values and one or more respective hashes of the one or more values in a ledger associated with a blockchain network, wherein the one or more values and the one or more respective hashes are stored within a block, wherein the block is a same blockchain block;
constructing a block hash from the one or more respective hashes of the one or more values, wherein the block hash is a hash of a block header and acts as a reference number for a reference block;
validating a transaction by identifying that a respective hash of a value matches the respective hash of the value from a previous transaction;
maintaining integrity of the block hash;
redacting at least one value stored within the block corresponding to the block hash, wherein redacting the at least one value includes setting bits associated with the at least one value to zero and maintaining the respective hash of the value and the block hash for the block.

16. The computer program product of claim 15, wherein redacting the transaction further comprises:
replacing the value with the respective hash of the value, wherein the respective hash of the value points to the decoupled pre-image; and
maintaining a decoupled pre-image of the value.

* * * * *